US012671487B2

(12) United States Patent
Gao et al.

(10) Patent No.: US 12,671,487 B2
(45) Date of Patent: Jun. 30, 2026

(54) DETERMINING A BEAM FAILURE EVENT FOR A CELL ACCORDING TO CHANNEL QUALITIES

(71) Applicant: ZTE Corporation, Shenzhen (CN)

(72) Inventors: Bo Gao, Shenzhen (CN); Zhaohua Lu, Shenzhen (CN); Yu Ngok Li, Shenzhen (CN); Fei Dong, Shenzhen (CN); Xianghui Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 343 days.

(21) Appl. No.: 18/516,099

(22) Filed: Nov. 21, 2023

(65) Prior Publication Data

US 2024/0088978 A1 Mar. 14, 2024

Related U.S. Application Data

(63) Continuation of application No. 17/559,736, filed on Dec. 22, 2021, now Pat. No. 11,843,438, which is a
(Continued)

(51) Int. Cl.
*H04B 7/06* (2006.01)
*H04L 1/1812* (2023.01)
(Continued)

(52) U.S. Cl.
CPC ....... *H04B 7/06964* (2023.05); *H04L 1/1812* (2013.01); *H04L 5/0053* (2013.01);
(Continued)

(58) Field of Classification Search
CPC .............. H04B 7/06964; H04W 76/19; H04W 72/569; H04W 72/1263; H04L 1/1812; H04L 5/0053
See application file for complete search history.

(56) References Cited

U.S. PATENT DOCUMENTS 10,349,441 B2 7/2019 Suzuki et al.
11,777,586 B2 10/2023 Shi et al.
(Continued)

FOREIGN PATENT DOCUMENTS

CN 109314875 A 2/2019
CN 109803297 A 5/2019
(Continued)

OTHER PUBLICATIONS

Communication pursuant to Article 94(3) EPC issued in 19 935 424.2-1206, dated Jun. 27, 2025 (6 pages).
(Continued)

*Primary Examiner* — Mewale A Ambaye
(74) *Attorney, Agent, or Firm* — Crowell & Moring LLP

(57) ABSTRACT

This disclosure relates to wireless radio link recovery methods. In various implementations, the method includes determining a beam failure event for a first cell, and transmitting a beam recovery request message on a shared uplink channel when available. In other implementations, the method includes determining that the shared uplink channel is not available for transmitting the beam recovery request message and transmitting a resource request to request allocation of the shared uplink channel via a second cell.

17 Claims, 10 Drawing Sheets

Related U.S. Application Data continuation of application No. PCT/CN2019/093810, filed on Jun. 28, 2019.

(51) Int. Cl.

| | | |
|---|---|---|
| *H04L 5/00* | (2006.01) | |
| *H04W 72/1263* | (2023.01) | |
| *H04W 72/566* | (2023.01) | |
| *H04W 76/19* | (2018.01) | |

(52) U.S. Cl.
CPC ..... *H04W 72/1263* (2013.01); *H04W 72/569* (2023.01); *H04W 76/19* (2018.02)

(56) References Cited

U.S. PATENT DOCUMENTS

| | | | | |
|---|---|---|---|---|
| 2018/0219604 | A1 | 8/2018 | Lu et al. | |
| 2018/0323856 | A1* | 11/2018 | Xiong | H04B 7/088 |
| 2019/0116510 | A1 | 4/2019 | Zhang et al. | |
| 2019/0159100 | A1 | 5/2019 | Liou et al. | |
| 2019/0166539 | A1 | 5/2019 | Chen et al. | |
| 2019/0230529 | A1 | 7/2019 | Sadiq et al. | |
| 2019/0394082 | A1* | 12/2019 | Cirik | H04W 76/28 |
| 2020/0163079 | A1 | 5/2020 | Choi et al. | |
| 2020/0170065 | A1 | 5/2020 | Xue et al. | |
| 2020/0275476 | A1 | 8/2020 | Yang et al. | |
| 2020/0288371 | A1 | 9/2020 | Zhou et al. | |
| 2020/0322035 | A1 | 10/2020 | Shi et al. | |
| 2020/0374960 | A1 | 11/2020 | Deenoo et al. | |
| 2021/0028848 | A1 | 1/2021 | Tsai et al. | |
| 2021/0029724 | A1 | 1/2021 | Tsai et al. | |
| 2021/0235292 | A1 | 7/2021 | Zhang et al. | |
| 2021/0314050 | A1 | 10/2021 | Li | |
| 2021/0345370 | A1 | 11/2021 | Lee et al. | |
| 2021/0409091 | A1 | 12/2021 | Svedman et al. | |
| 2022/0116094 | A1 | 4/2022 | Wang et al. | |
| 2022/0201731 | A1 | 6/2022 | Lee et al. | |
| 2023/0164865 | A1* | 5/2023 | Kang | H04B 7/06968 |
| | | | | 370/329 |
| 2023/0247635 | A1* | 8/2023 | Yin | H04W 72/54 |
| | | | | 370/329 |
| 2024/0049330 | A1* | 2/2024 | Cirik | H04W 52/06 |
| 2024/0064540 | A1* | 2/2024 | Zhang | H04W 24/08 |
| 2024/0129015 | A1* | 4/2024 | Harada | H04W 24/08 |
| 2024/0260128 | A1* | 8/2024 | Khoshkholgh Dashtaki | |
| | | | | H04B 7/0626 |

FOREIGN PATENT DOCUMENTS

| | | | | |
|---|---|---|---|---|
| CN | 109842499 | A | 6/2019 | |
| CN | 109842894 | A | 6/2019 | |
| EP | 3 253 152 | A1 | 12/2017 | |
| JP | 2018-50086 | A | 3/2018 | |
| JP | 2020/528707 | A | 9/2020 | |
| JP | 2021/507627 | A | 2/2021 | |
| WO | 2018/050086 | A | 3/2018 | |
| WO | WO 2019/022561 | A1 | 1/2019 | |
| WO | WO 2019/027294 | A1 | 2/2019 | |
| WO | WO-2019032882 | A1 * | 2/2019 | H04B 7/088 |
| WO | WO 2019/119399 | A1 | 6/2019 | |

OTHER PUBLICATIONS

Office Action issued in Korean Application No. 10-2021-7042319 dated, Aug. 7, 2025, with English translation (6 pages).

Communication pursuant to Article 94(3) PEC issued in European Application No. 19 935 424.2 dated Feb. 24, 2025 (7 pages).

Korean-language Office Action issued in Korean Application No. 10-2021-7042319 dated Dec. 12, 2024 with English Summary (10 pages).

Samsung; "Miscellaneous corrections", 3GPP TSG-RAN WG2 Meeting #104 R2-1818749, Nov. 12-16, 2018, (36 pages).

Written Opinion issued by the Intellectual Property Office of Vietnam—No. 85665/SHTT-SC.ip, dated Aug. 30, 2024, w/English translation, 4 pages.

First Office Action for corresponding application No. CN 202210590031.1 dated Oct. 26, 2022, 11p, in Chinese language.

English language translation of the First Office Action for corresponding application No. CN 202210590031.1 dated Oct. 26, 2022, 10p.

Extended European Search Report for corresponding application No. EP 1935424.2 dated Dec. 6, 2022, 8p.

International Search Report for priority application No. PCT/CN2019/093810 dated Mar. 26, 2020, 2p.

Written Opinion for priority application No. PCT/CN2019/093810 dated Mar. 26, 2020, 4p.

Official Action, Notice of Reasons for Rejection for corresponding Japanese application No. 2021-576599 dated Jul. 19, 2023, 4p, in Japanese language.

English language translation of Notice of Reasons for Rejection for corresponding Japanese application No. 2021-576599 dated Jul. 19, 2023, 8p.

CATT, "Summary of email discussion on beam failure recover on SCell", 3GPP TSG RAN WG1 meeting #92, R1-1803397, Mar. 2, 2018, 3p, GR.

Ericsson, "Multi-cell beam recovery," 3GPP TSG-RAN WG1 meeting #93, R1-1806221, May 25, 2018, 5p, KR.

Intel Corporation, "Summary on SCell BFR and Beam Measurement", 3GPP TSG-RAN WG1 Meeting #94b, R1-1811853, Oct. 12, 2018, 15p, CN.

Lenovo et al., Discussion of beam failure recovery for carrier aggregation, 3GPP TSG RAN WG1 meeting #92, R1-1804211. Apr. 20, 2018, CN.

Mediatek Inc., "Discussion on beam recovery mechanism," 3GPP TSG-RAN WG1, meeting #88bis, R1-1704465, dated Apr. 7, 2017, 5p, US.

Qualcomm Incorporated, "Beam Recovery Procedures," 3GPP TSG-RAN WG1 meeting #88, R1-1702606, dated Feb. 17, 2017, 89, GR.

EP Search Report mailed Sep. 13, 2024 in Appln. No. 19 935 424.2 (6 pages).

Examination Report No. 1 issued Mar. 18, 2025 in Australian Patent Application No. 2019454618 (4 pages).

Notice of Acceptance for Patent Application issued May 22, 2025 in Australian Patent Application No. 2019454618 (3 pages).

Official Action for corresponding Japanese application No. 2021-576599 dated Dec. 25, 2023, 3p, in Japanese language.

English language translation of Notice of Reasons for Rejection (Official Action) for corresponding Japanese application No. 2021-576599 dated Dec. 25, 2023, 4p.

* cited by examiner

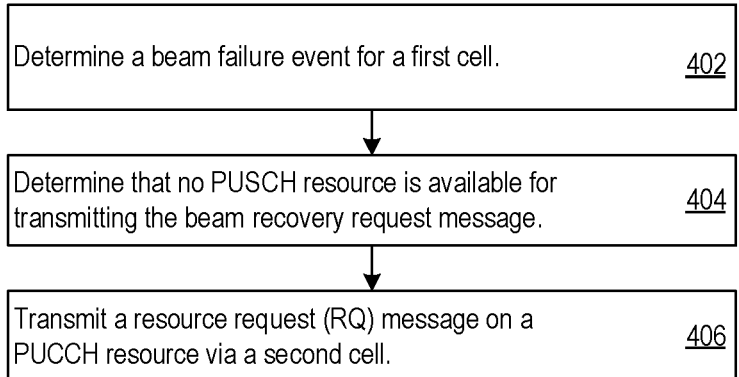

| Determine a beam failure event for a first cell. | 402 |
| Determine that no PUSCH resource is available for transmitting the beam recovery request message. | 404 |
| Transmit a resource request (RQ) message on a PUCCH resource via a second cell. | 406 |

FIG. 4

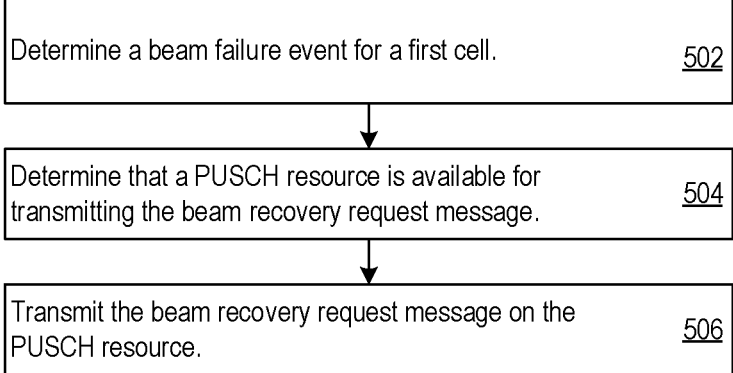

| Determine a beam failure event for a first cell. | 502 |
| Determine that a PUSCH resource is available for transmitting the beam recovery request message. | 504 |
| Transmit the beam recovery request message on the PUSCH resource. | 506 |

FIG. 5

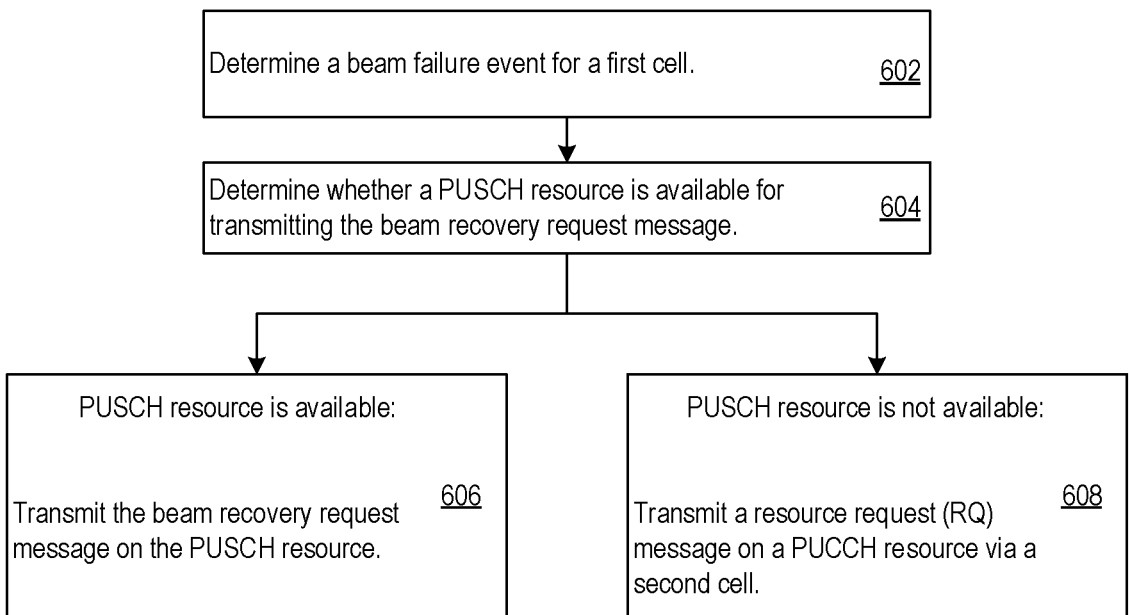

Determine a beam failure event for a first cell.　602

Determine whether a PUSCH resource is available for transmitting the beam recovery request message.　604

PUSCH resource is available:

Transmit the beam recovery request message on the PUSCH resource.　606

PUSCH resource is not available:

Transmit a resource request (RQ) message on a PUCCH resource via a second cell.　608

FIG. 6

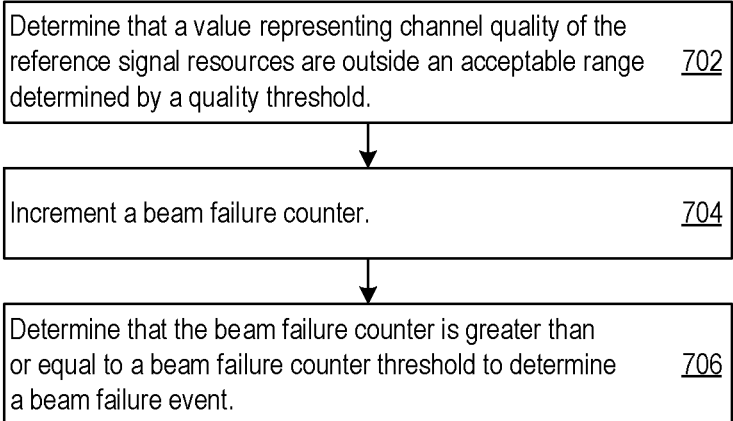

Determine that a value representing channel quality of the reference signal resources are outside an acceptable range determined by a quality threshold.　702

Increment a beam failure counter.　704

Determine that the beam failure counter is greater than or equal to a beam failure counter threshold to determine a beam failure event.　706

FIG. 7

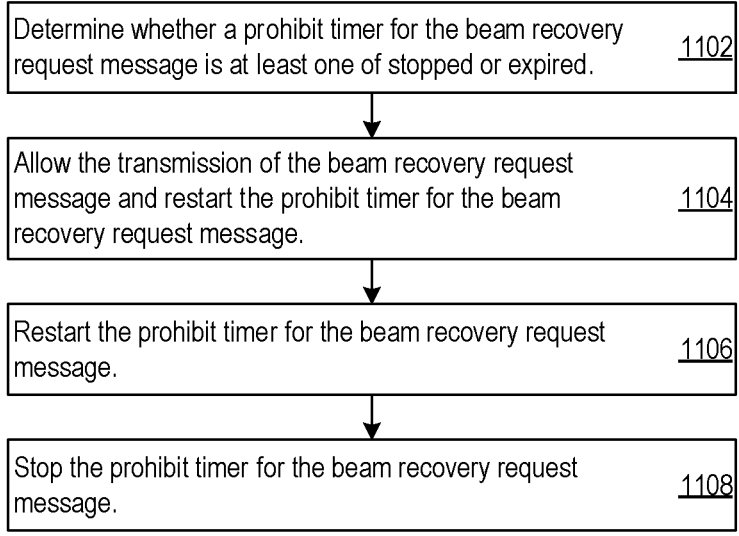

| | |
|---|---|
| Determine whether a prohibit timer for the beam recovery request message is at least one of stopped or expired. | 1102 |
| Allow the transmission of the beam recovery request message and restart the prohibit timer for the beam recovery request message. | 1104 |
| Restart the prohibit timer for the beam recovery request message. | 1106 |
| Stop the prohibit timer for the beam recovery request message. | 1108 |

FIG. 11

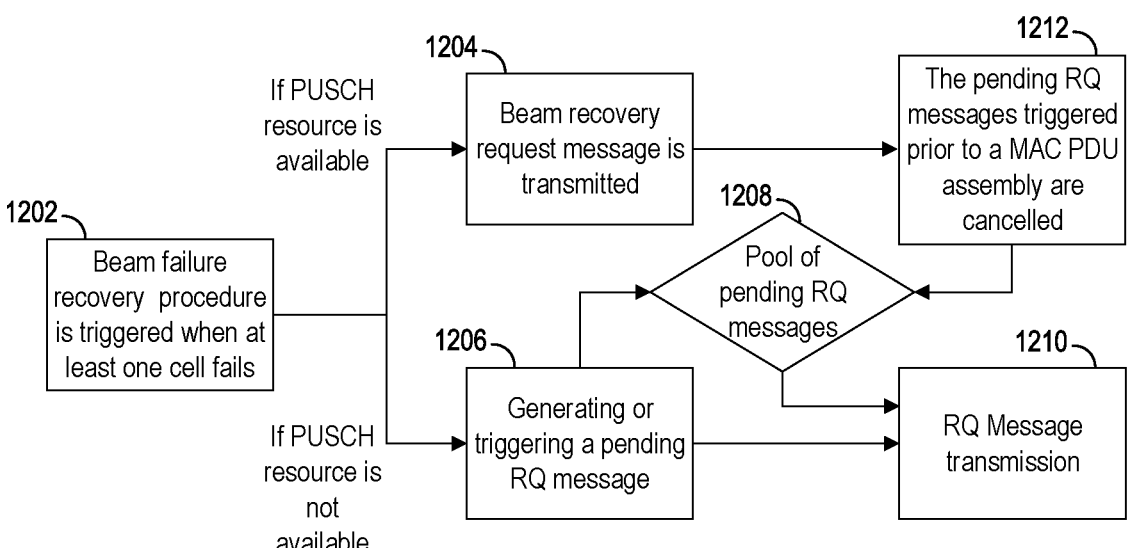

FIG. 12

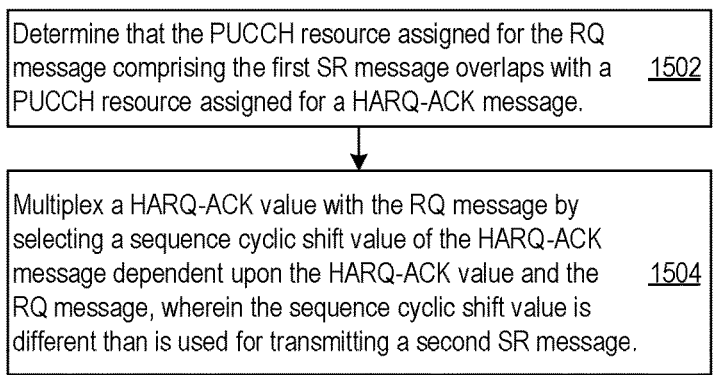

Determine that the PUCCH resource assigned for the RQ message comprising the first SR message overlaps with a PUCCH resource assigned for a HARQ-ACK message.          1502

Multiplex a HARQ-ACK value with the RQ message by selecting a sequence cyclic shift value of the HARQ-ACK message dependent upon the HARQ-ACK value and the RQ message, wherein the sequence cyclic shift value is different than is used for transmitting a second SR message.          1504

FIG. 15

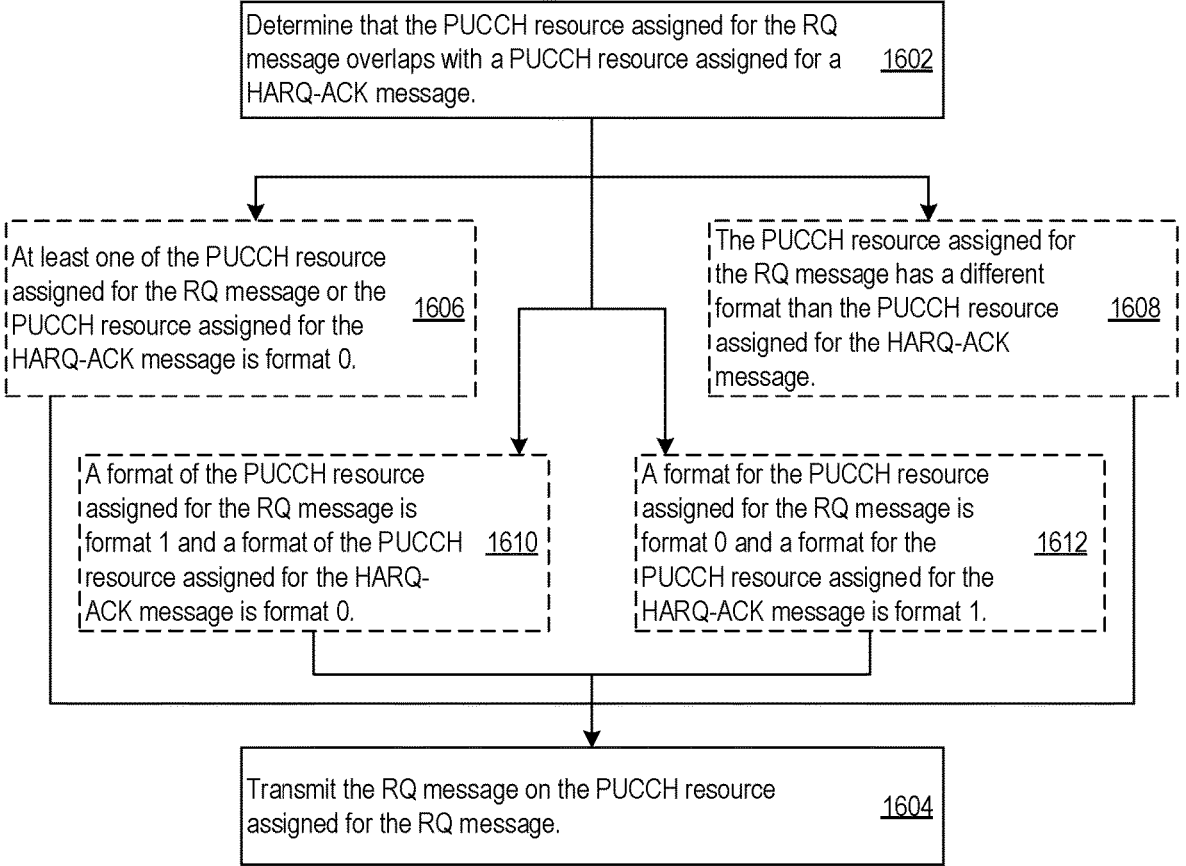

Determine that the PUCCH resource assigned for the RQ message overlaps with a PUCCH resource assigned for a HARQ-ACK message.          1602

At least one of the PUCCH resource assigned for the RQ message or the PUCCH resource assigned for the HARQ-ACK message is format 0.          1606

The PUCCH resource assigned for the RQ message has a different format than the PUCCH resource assigned for the HARQ-ACK message.          1608

A format of the PUCCH resource assigned for the RQ message is format 1 and a format of the PUCCH resource assigned for the HARQ-ACK message is format 0.          1610

A format for the PUCCH resource assigned for the RQ message is format 0 and a format for the PUCCH resource assigned for the HARQ-ACK message is format 1.          1612

Transmit the RQ message on the PUCCH resource assigned for the RQ message.          1604

FIG. 16

| Number of failed cells |
| Index for 1st failed cell |
| New candidate RS index or non-identified RS for 1st failed cell |
| Index for 2nd failed cell |
| New candidate RS index or non-identified RS for 2nd failed cell |
| ... ... |
| Index for M-th failed cell |
| New candidate RS index or non-identified RS for M-th failed cell |

| Index for failed cell |
| New candidate RS index or non-identified RS for the failed cell |

| F | New candidate RS index or non-identified RS for cell-1 |
| F | New candidate RS index or non-identified RS for cell-2 |
| | ... ... |
| F | New candidate RS index or non-identified RS for cell-M |

DETERMINING A BEAM FAILURE EVENT FOR A CELL ACCORDING TO CHANNEL QUALITIES

RELATED APPLICATION

This application is a continuation application of U.S. patent application Ser. No. 17/559,736, filed on Dec. 22, 2021, which is a continuation application of International Application No. PCT/CN2019/093810, filed Jun. 28, 2019 and entitled METHODS FOR WIRELESS RADIO LINK RECOVERY. The entireties of the above applications are incorporated herein by reference.

TECHNICAL FIELD

This disclosure is directed generally to wireless communications and particularly to wireless radio link recovery procedures.

BACKGROUND

Wireless communication technologies are moving the world towards a rapidly increasing network connectivity. High-speed and low-latency wireless communications rely on efficient network resource management and allocation between user wireless communication devices and wireless communication nodes (including but not limited to wireless base stations). Unlike traditional circuit-switched networks, efficient wireless access networks may not rely on dedicated user channels. Instead, wireless network resources (such as carrier frequencies, transmission beams, and transmission time slots) for transmitting voice or other types of data between the wireless communication devices and the wireless communication nodes may be allocated and changed as transmission conditions or configurations change.

SUMMARY

In one embodiment, a wireless radio link recovery method includes determining, by a wireless communication device, a beam failure event for a first cell according to channel qualities corresponding to one or more reference signal resources transmitted by a wireless communication node. The wireless communication device then determines that a physical uplink shared channel (PUSCH) resource is available for transmitting a beam recovery request message. The method also includes transmitting, by the wireless communication device to the wireless communication node, the beam recovery request message on the PUSCH resource, wherein the beam recovery request message comprises an index of the first cell or a cell group including the first cell.

In another embodiment, another wireless radio link recovery method includes determining, by the wireless communication device, a beam failure event for the first cell according to the channel qualities corresponding to the one or more reference signal resources transmitted by the wireless communication node. The method also includes transmitting, by the wireless communication device to the wireless communication node via a second cell, a resource request (RQ) message on a physical uplink control channel (PUCCH) resource, the RQ message requesting allocation of a PUSCH resource.

In another embodiment, another wireless radio link recovery method includes determining, by the wireless communication device, the beam failure event for the first cell according to the channel qualities corresponding to the one or more reference signal resources transmitted by the wireless communication node. The wireless communication device then determines whether a PUSCH resource is available for transmitting the beam recovery request message. When the PUSCH resource is available for transmitting the beam recovery request message, the wireless communication device transmits to the wireless communication node, the beam recovery request message on the PUSCH resource, wherein the beam recovery request message comprises an index of the first cell or a cell group including the first cell. However, when the PUSCH resource is not available for transmitting the beam recover request message, the wireless communication device transmits to the wireless communication node via a second cell, the resource request (RQ) message on an uplink control channel, the RQ message requesting allocation of the PUSCH resource.

The above embodiments and other aspects and alternatives of their implementations are described in greater detail in the drawings, the descriptions, and the claims below.

BRIEF DESCRIPTION OF THE DRAWINGS

FIG. 4 shows another example of a method for wireless radio link recovery, in accordance with various embodiments.

FIG. 5 shows another example of a method for wireless radio link recovery, in accordance with various embodiments.

FIG. 6 shows another example of a method for wireless radio link recovery, in accordance with various embodiments.

FIG. 7 shows an example a procedure for determining a beam failure event, in accordance with various embodiments.

FIG. 11 shows another example of additional details of a method for wireless radio link recovery, according to various embodiments.

FIG. 12 shows an example of a process for generating and canceling pending RQ messages, according to various embodiments.

FIG. 15 shows another example of additional details of a method for wireless radio link recovery, according to various embodiments.

FIG. 16 shows another example of additional details of a method for wireless radio link recovery, according to various embodiments.

FIG. 17 shows example beam recovery request message formats, in accordance with various embodiments.

DETAILED DESCRIPTION

Figure 1:
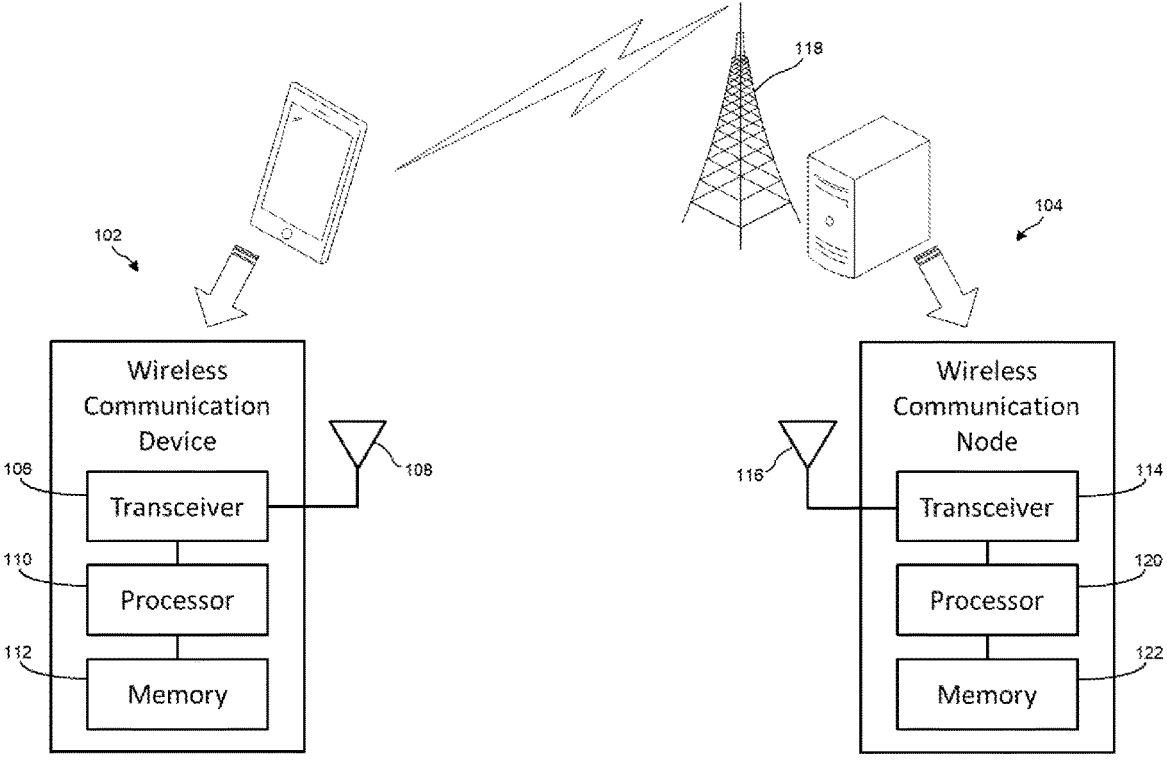
FIG. 1 shows an example system diagram including a wireless communication device and a wireless communication node according to various embodiments.
Figure 2:
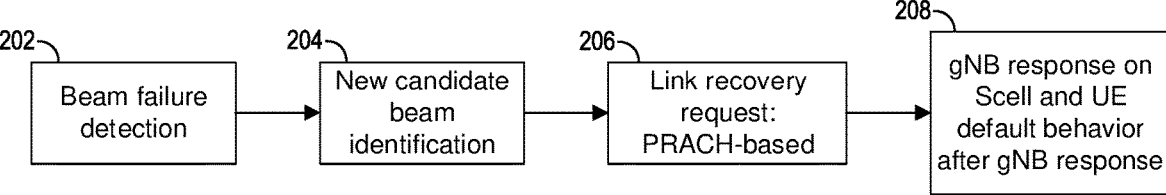
FIG. 2 shows an example of a prior art wireless radio link recovery procedure.

In the 5G new radio (NR) standard, analog and digital beam-forming concepts are introduced to improve the robustness of high-frequency communications (e.g., above 6 GHz). However, the directional transmission of analog beam-forming limits multipath diversity and makes communications above 6 GHz vulnerable to channel fluctuations. For example, such channel fluctuations may include communications blockage due to the human body, vehicles, buildings, landscaping, and so on.

A wireless radio link recovery procedure, also referred to as a beam recovery procedure, has previously been adopted for 5G NR, in order to enable a wireless communication device, such as a user equipment (UE), to initialize an event-driven reporting of a beam failure to a wireless communication node, such as a next generation Node B (gNB), and to identify a beam for the subsequent data transmission. In the 5G NR Release 15, the link recovery procedure includes the following four steps: a) beam failure detection, b) new candidate beam identification, c) link/beam recovery request from the UE to a next generation Node B (gNB), and d) the gNB response to the UE for recovery. Currently, the procedure can be configured only for a primary cell (Pcell) or a primary second cell (PScell). Both of these cell types are configured with uplink (UL) channels for carrying a link recovery request, for example, on a physical random access channel (PRACH).

However, a general second cell (Scell) can often be configured for downlink (DL) only. For example, in one configuration a wireless communication device may include a Pcell with DL capabilities and UL capabilities (e.g., below 6 GHz), but may also include one or several Scells with DL capabilities only (e.g., above 6 GHz). In such a configuration, the link recovery request cannot be carried by the Scell and transmitted to gNB due to lack of UL capabilities. Accordingly, various embodiments are disclosed herein that address such shortcomings. Moreover, although the following embodiments address the shortcomings identified above with respect to the Scell(s), the following embodiments may be implemented with any cell type, including a Pcell or PScell or other cell type that includes UL capabilities.

As mentioned above, previous 5G NR specification versions include beam-forming concepts. As the expense of wide or ultra-wide spectrum, the considerable propagation loss induced by the high frequency propagation, e.g., above 6 GHz, becomes a noticeable challenge. To solve this, antenna array and beam-forming training technologies using massive MIMO, e.g., up to 1024 antenna element for one node, may be adopted to achieve beam alignment and obtain sufficiently high antenna gain. To keep the implementation cost low while still benefitting from the antenna array and associated antenna gain, analog phase shifters may be used to implement mmWave beam-forming, which means that the number of phases to be controlled is finite and constant modulus constraints are placed on these antenna elements. Given the pre-specified beam patterns, the variable-phase-shift-based beam forming training targets to identify the best pattern for subsequent data transmission generally.

In order to improve robustness, the UE can initialize one link recovery procedure in Pcell or PScell, as shown in FIG.

2, where the link recovery request transmission is based on physical random access channel (PRACH). With a Pcell or PSCell, the detailed procedure for contention free based link recovery is summarized as follows:

a) Beam failure detection (202): One or more downlink reference signals (DL RSs) are configured, or implicitly derived, for beam failure detection, and the corresponding block error ratio (BLER) results (as the metric for beam failure detection) are determined through measuring the one or more DL RSs. When the BLER of all or a portion of the DL RSs is not worse than the pre-defined threshold within a configured window, the MAC-CE layer is notified with an indication of link failure instance, which may also be referred to as an indication of beam failure instance or a beam failure instance indication. In the MAC-CE layer, if the indication of link failure instance is received from the PHY layer, the UE shall increment a counter for the beam failure instance or indication, i.e., BFI_COUNTER, by 1, and when the BFI_COUNTER is not less than the pre-configured threshold, a beam failure event is declared.

b) New candidate beam identification (204): One or more DL RSs are configured as candidate RSs for a new candidate beam. If the reference signal received power (L1-RSRP) results (as a metric for the new beam) associated with the DL RS is not worse than the pre-defined threshold, the DL RS can be assumed as a new candidate beam, (i.e., q_new).

c) Link recovery request (206): When a beam failure event is declared and/or at least one new candidate beam is found, the UE shall initialize a PRACH transmission associated with the selected RS q_new from step-b (when the channel quality of any DL RSs as a candidate beam for recovery is all worse than the threshold, any one of DL RS can be selected randomly), where each DL RS for a new beam is associated with one or more PRACH occasions. For example, in FIG. 1B, N SS blocks, also called a SS/PBCH block, are respectively associated with N PRACH occasions.

d) gNB response for recovery (208): After transmitting a PRACH transmission for a link recovery request, the UE monitors the physical downlink control channel (PDCCH) in a dedicated control resource set (CORESET) or a dedicated searching space for link recovery according to the quasi co-location (QCL) parameter associated with the DL RS q_new. Once the gNB response is detected, the UE should assume that the gNB response for recovery is received successfully and the corresponding UE behavior, e.g., updating QCL assumption for one or more CORESETs and a spatial filter of PUCCH resources, are performed.

However, as mentioned above, the preceding procedure does not address the needs of all situations or configurations. Accordingly, various embodiments are disclosed herein that address such shortcomings.

A wireless access network provides network connectivity between wireless communication devices (e.g., mobile devices) and an information or data network (such as a voice communication network or the Internet). An example wireless access network may be based on cellular technologies, which may further be based on, for example, 4G, Long Term Evolution (LTE), 5G, and/or New Radio (NR) technologies and/or formats. FIG. 1 shows an example system diagram including a wireless communication device 102 and a wireless communication node 104 according to various embodiments. The wireless communication device 102 may comprise a user equipment (UE), which may further include but is not limited to a mobile phone, smart phone, tablet, laptop computer, or other mobile devices that are capable of communicating wirelessly over a network. The wireless communication device 102 may include transceiver circuitry 106 coupled to an antenna 108 to effect wireless communication with the wireless communication node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Similarly, the wireless communication node 104 may comprise a base station or other wireless network access points capable of communicating wirelessly over a network with one or many mobile stations. For example, the wireless communication node 104 may comprise a 4G LTE base station, a 5G NR base station, a 5G central-unit base station, a 5G distributed-unit base station, a next generation Node B (gNB), an enhanced Node B (eNB), or other base station, in various embodiments. The wireless communication node 104 may include transceiver circuitry 114 coupled to an antenna 116, which may include an antenna tower 118 in various approaches, to effect wireless communication with the wireless communication device 102. The transceiver circuitry 114 may also be coupled to one or more processors 120, which may also be coupled to a memory 122 or other storage device. The memory 122 may store therein instructions or code that, when read and executed by the processor 120, cause the processor 120 to implement various ones of the methods described herein.

When a wireless radio link between the wireless communication node 104 and the wireless communication device 102 fails, communications using that link stops. A wireless radio link recovery procedure is required to re-establish communications.

General Description of the New Wireless Radio Link Recovery Procedure

In accordance with various embodiments, the disclosed wireless radio link recovery procedure or method is performed by the wireless communication device 102 and includes two different sub-procedures. Generally, upon determining that a cell fails at 310 (e.g., a first cell 302 up to an nth cell 304, which beam failure events are detected at 306 and 308) one of two sub-procedures may be triggered. In one approach, a first sub-procedure ("step 1") 318 includes transmission 322 of a resource request (RQ) message to a wireless communication node 104 to notify it that a beam failure event has occurred and to simultaneously request a PUSCH resource on which to transmit a beam recovery request message. The transmission of the RQ message may be governed by various collision and multiplexing rules 326.

The second sub-procedure ("step 2") 314 involves transmission of the beam recovery request message (e.g., recovery reporting message) to the wireless communication node 104 on a PUSCH resource. The transmission may include a multiplexing and/or message assembly procedure 320 and may be subject to priority rules 324. In various approaches, the second sub-procedure ("step 2") 314 may be triggered whenever a cell fails. However, if no PUSCH resource is available (316), the beam recovery request message cannot be transmitted and a new PUSCH resource may instead be requested via the first sub-procedure ("step 1") 318.

Thus, in certain embodiments, the first sub-procedure ("step 1") 318 may be triggered when the second sub-procedure ("step 2") 314 cannot be performed because there is no available PUSCH resource available to transmit a beam recovery request message, as shown at 316. Alternatively, the first sub-procedure ("step 1") 318 may be triggered whenever a cell fails in certain embodiments. Each of these various procedures and methods are discussed in further detail below.

With reference to FIG. 4, a method for wireless radio link recovery is disclosed in accordance with various embodiments. In particular, the method of FIG. 4 corresponds to the first sub-process ("step 1") 318 discussed in FIG. 3. At 402, the wireless communication device 102 determines a beam failure event for a first cell according to channel qualities corresponding to one or more reference signal (RS) resources transmitted by the wireless communication node 404. The beam failure event may apply to a single first cell or a cell group to which the first cell belongs. In various embodiments, the first cell is an Scell, though the first cell may be a Pcell or PScell in other approaches.

Figure 3:
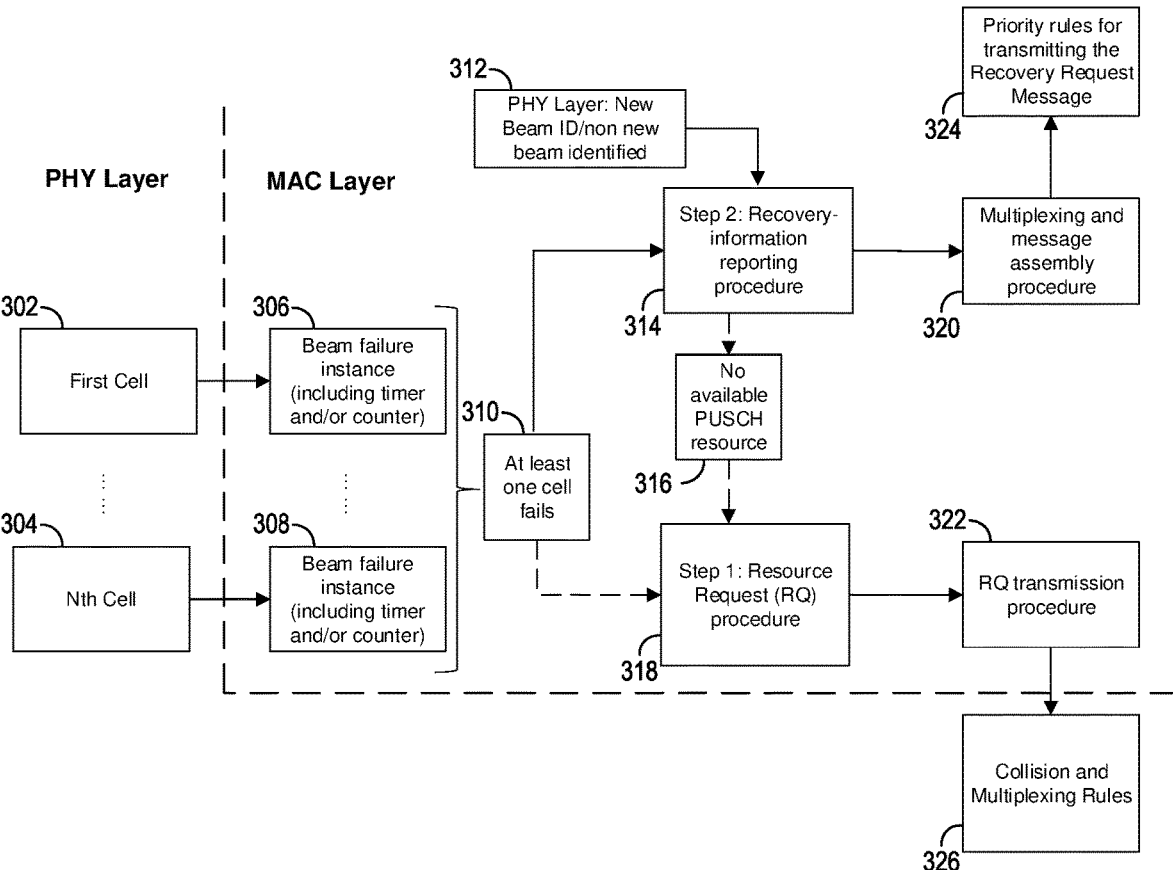
FIG. 3 shows an example of a method for wireless radio link recovery, in accordance with various embodiments.

Optionally, at 404, the wireless communication device 102 determines that no PUSCH resource is available for transmitting a beam recovery request message (corresponding to step 316 in FIG. 3). This may be a triggering condition for performing the first sub-process ("step 1") 318, and more specifically, the following step. In response, at 406, the wireless communication device 102 transmits to the wireless communication node 104 a resource request (RQ) message on a physical uplink control channel (PUCCH) resource via a second cell. The RQ message notifies the wireless communication node 104 of the beam failure event, and simultaneously requests allocation of a PUSCH resource to transmit the beam recovery request message corresponding to the beam failure event.

The RQ message may include or comprise different message types. In some examples, the RQ message is a dedicated recovery-specific resource request (RS-RQ) message that includes, for example, a dedicated RS-RQ configuration or sequence and/or a dedicated PUCCH resource.

In other examples, the RQ message is a scheduling request (SR) message that may be a dedicated SR message type that indicates it corresponds to a beam failure event (as opposed to a normal SR message that is not associated with a beam failure event). For example, the SR message may be configured with a parameter of usage for beam recovery or associated with a parameter of beam recovery configuration. In yet other examples, the RQ message is an SR message that is configured with a parameter of higher priority than a normal SR message that is not associated with a beam failure event.

When the RQ message is configured in one of the manner described above, the wireless communication node 104 can receive the information of the beam failure event as distinguished from a normal SR message (or another message), and can responsively schedule or allocate UL-SCH resources quickly and with priority in order to receive the beam recovery request message from the wireless communication device 102 in order to attempt to recover the wireless link in time. However, in certain examples or configurations where the above configurations of the RQ message (e.g., RS-RQ message or dedicated/prioritized SR message) are not available or utilized, the RQ message can simply be a normal SR message.

With reference to FIG. 5, another method for wireless radio link recovery is disclosed in accordance with various embodiments. In particular, the method of FIG. 5 corresponds to the second sub-process ("step 2") 314 discussed in FIG. 3. At 502 (which is similar to step 402 in FIG. 4), the wireless communication device 102 determines a beam failure event for a first cell according to channel qualities corresponding to one or more RS resources transmitted by the wireless communication node 404.

At 504, the wireless communication device 102 determines that a PUSCH resource is available for transmitting a beam recovery request message. In response, the wireless communication device 102 transmits to the wireless communication node 104 the beam recovery request message on the PUSCH resource. In this embodiment, the beam recovery request message comprises an index (e.g., identification) of the first cell or a cell group including the first cell.

The beam recovery request message may also be called a recovery-information reporting message. In certain embodiments, the beam recovery request message is a medium access control (MAC) control element (MAC-CE) message. In certain embodiments, the beam recovery request message includes index(es) of the failed cells and new candidate beam index(es) for the failed cell(s), if found. If no new candidate beam for the failed cell(s) is found, an indication that no candidate beam or candidate reference signal is identified for the cell can be delivered in the beam recovery request message.

With reference to FIG. 6, yet another method for wireless radio link recovery is disclosed in accordance with various embodiments. In particular, the method of FIG. 5 incorporates both the first sub-process ("step 1") 318 and the second sub-process ("step 2") 314 discussed in FIG. 3 and above. At 602 (which is similar to steps 402 and 502), the wireless communication device 102 determines a beam failure event for a first cell. At 604, the wireless communication device 102 determines whether or not a PUSCH resource is available for transmitting a beam recovery request message. If the wireless communication device 102 determines that the PUSCH resource is available, the wireless communication device 102 responsively transmits to the wireless communication node 104 the beam recovery request message, including the index of the first cell or a cell group including the first cell, on the PUSCH resource at 606. However, if the wireless communication device 102 determines that the PUSCH resource is not available, the wireless communication device 102 transmits to the wireless communication node 104 via a second cell the RQ message on the PUCCH resource at 608.

In accordance with these various embodiments, the wireless communication device 102 may transmit the beam recovery request message on the PUSCH resource using a second cell or another different cell. For example, if the first cell is an Scell that does not have UL capabilities, then the wireless communication device 102 may use the UL capabilities of a Pcell or a PScell (or a different Scell) to transmit the beam recovery request message on the PUSCH resource. Additionally, even if the Scell does have UL capabilities, a different cell (Pcell, PScell, or Scell) may be used to transmit the beam recovery request message. However, in other embodiments, the wireless communication device 102 may transmit the beam recovery request message on the PUSCH resource using the same first cell. Different variations are possible.

Beam Failure Detection Procedures

When one or more cells (e.g., Scell(s)) is configured with the link recovery procedure, beam failure detection procedures, including independent counters for beam failure instances, are performed accordingly. Once the counter(s) exceeds a threshold, a beam failure event for the corresponding cell is claimed to begin initializing the link recovery procedure.

With reference to FIG. 7, a procedure for determining a beam failure event for the first cell further includes, at 702, the wireless communication device 102 determining that one or more values representing channel quality of the one or more RS resources are outside an acceptable range determined by a quality threshold (thereby indicating that the one or more RS resources have poor quality). For example, a block error rate (BLER) may be used as the metric for channel quality to indicate beam failure, and if the value of the BLER reaches and/or exceeds a threshold value, then that indicates that the particular RS resource has poor quality. Other channel quality metrics may be used. If the wireless communication device 102 determines that the value representing channel quality indicates that the one or more RS resources have poor quality, then, at 704, the wireless communication device 102 will increment a beam failure counter (indicated in FIG. 3 at 306 and 308). Similarly, at 706, the wireless communication device 102 determines that the beam failure counter is greater than or equal to a beam failure counter threshold, and responsively determines a beam failure event has occurred for the first cell or a group of cells including the first cell.

The beam failure counter can apply to an individual cell or a cell group including many cells. As such, two alternative solutions are presented for counting and handling failures with regard to these multiple cells.

In a first approach, a beam failure event is claimed for a cell, where the beam failure detection counter and beam failure detection timer are configured per each individual cell, and the beam failure event is determined independently for each cell that is configured with the recovery procedure. For example, the first cell may be part of a cell group, and determining the beam failure event for the first cell of the cell group includes determining a beam failure event for any cell of the cell group independently.

In this first approach, the physical layer can inform the higher layer of a beam failure event with a periodicity determined by the maximum between the shortest periodicity among the periodic channel state information reference signals (CSI-RS) and/or the synchronization signal (SS) blocks from reference signal(s) (RS) used for beam failure detection of the corresponding cell.

In a second approach, a beam failure event is claimed for a cell group when at least one cell from the cell group fails. For example, the first cell may be part of a cell group, and determining the beam failure event for the first cell includes determining the beam failure event for all or some of the cells in the cell group.

In this second approach, the physical layer can inform the higher layer of beam failure event with a periodicity determined by the maximum between the shortest periodicity among the periodic CSI-RS and/or SS blocks from reference signal(s) (RS) used for beam failure detection of any cells configured with the beam recovery procedure.

Furthermore, the counter or timer for beam failure detection of a cell may be stopped or reset if the beam recovery procedure corresponding to the cell is successfully completed.

Beam Failure Recovery Timer

To conserve UL resource overhead and to prohibit highly frequent re-transmissions of various UL signals relating to the beam recovery process, various maximum re-transmission numbers (e.g., counters) or re-transmission periodicity (e.g., timers) for transmitting the RQ message and/or the beam recovery request message can be configured.

Figure 8:
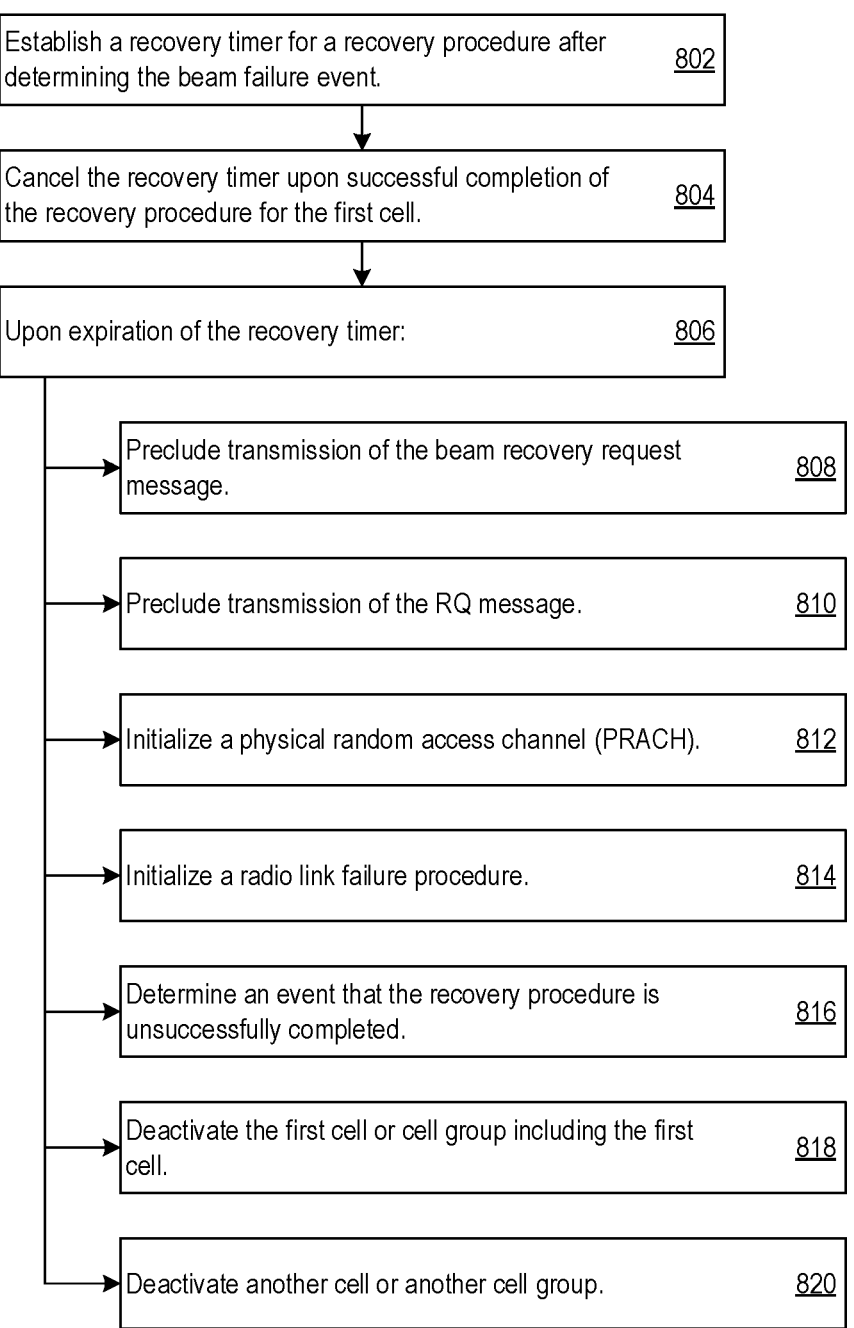
FIG. 8 shows an example of additional details of a method for wireless radio link recovery, according to various embodiments.

One example of such a timer is a recovery timer, which can set a maximum duration after determining a beam failure event to attempt to recover the communication link for the cell. With reference to FIG. 8, for example, the wireless communication device 102 can establish the recovery timer for a recovery procedure after determining the beam failure event for the first cell at 802. Similarly, upon successful completion of the recovery procedure for the first cell, the wireless communication device 102 can cancel the recovery timer at 804. However, upon expiration of the recovery timer at 806, the wireless communication device 102 can perform at least one of the following processes:

Precluding transmission of the beam recovery request message (808);

Precluding transmission of the RQ message on the PUCCH (810);

Initializing a physical random access channel (PRACH) (e.g., for contention-based RACH) (812);

Initializing a radio link failure procedure (814);

Determining an event that the recovery procedure is unsuccessfully completed (816);

Deactivating the first cell or cell group including the first cell (818); and/or Deactivating another cell or another cell group, wherein the other cell or other cell group is associated with the recovery configuration or is associated with the recovery timer (820).

Configuration Parameters for RQ Message Transmission

Figure 9:
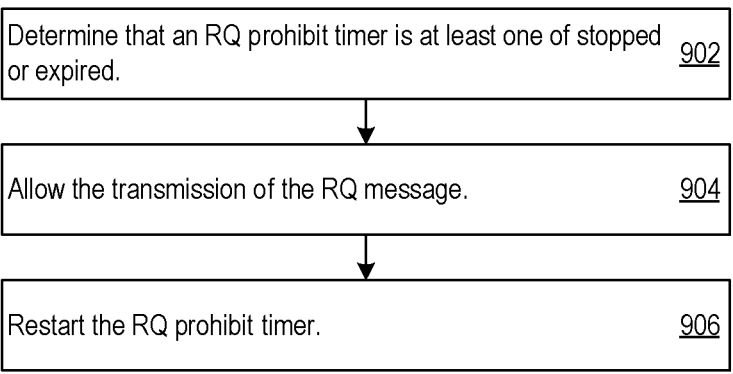
FIG. 9 shows another example of additional details of a method for wireless radio link recovery, according to various embodiments.

In a similar manner to the beam failure recovery timer discussed above, various timers and/or counters may be configured for the transmission of the RQ message, as well. In one approach, the configuration for the RQ message includes an RQ prohibit timer. An RQ message cannot be transmitted when the RQ prohibit timer is running or is not expired. Conversely, an RQ message can be transmitted when the RQ prohibit timer is stopped or is expired. With reference to FIG. 9, which illustrates additional details of the method of wireless radio link recovery in accordance with various embodiments, the wireless communication device 102 may determine that an RQ prohibit timer is at least one of stopped or expired at 902. Also, the wireless communication device 102 may allow the transmission of the RQ message at 904 and restart the RQ prohibit timer at 906 when the RQ prohibit timer is at least one of stopped or expired. Further, these conditions may occur when the RQ prohibit timer is associated with the first cell or an RQ configuration.

Additionally, the RQ prohibit timer may be restarted if:

The RQ transmission counter (discussed below) is less than or equal to the threshold for maximum number of transmissions;

The RQ message is transmitted on a valid PUCCH resource;

One or more radio resource control (RRC) parameter in the RQ message configuration (e.g., or an associated SR configuration) is reconfigured; and/or An RS for beam failure detection and/or an RS for new candidate beam determination is reconfigured or re-determined.

Figure 10:
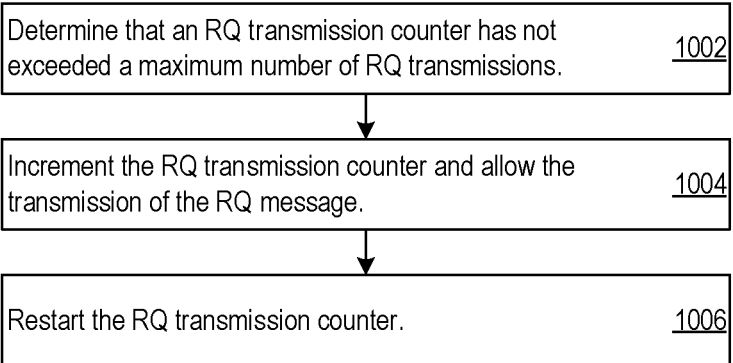
FIG. 10 shows another example of additional details of a method for wireless radio link recovery, according to various embodiments.

Similarly still, the configuration for the RQ message transmission may also be subject to an RQ transmission counter. With reference to FIG. 10, which illustrates additional details of the method of wireless radio link recovery in various embodiments, the wireless communication device

102 may determine that an RQ transmission counter has not exceeded or reached a maximum number of RQ transmissions at 1002. Also, the wireless communication device 102 may increment the RQ transmission counter and allow the transmission of the RQ message at 1004 when the RQ transmission counter has not exceeded the maximum number of RQ transmissions. However, when the RQ transmission counter is greater than or equal to the maximum number of RQ transmissions at 1006, the wireless communication device 102 may perform at least one of the following procedures:

Notifying the RRC to release PUCCH for all serving cells;

Notifying the RRC to release sounding reference signals (SRS) for all serving cells;

Clearing any configured downlink assignments or uplink grants;

Clearing any PUSCH resources for semi-persistent channel state information (CSI) reporting;

Initiating a random access procedure;

Cancelling all pending RQ messages for the first cell; and/or

Deactivating the first cell or cell group including the first cell.

Additionally, if an RQ message is triggered and there are no other RQ messages pending, the RQ transmission counter is reset to 0, particularly when there are no other RQ messages pending that correspond to the same RQ configuration.

Additionally, at 1008, the wireless communication device 102 can reset the RQ transmission counter when at least one of the following conditions is met:

The RQ transmission counter is less than or equal to the threshold maximum number of transmission;

The RQ message is transmitted on one valid PUCCH resource;

An RQ transmission is triggered and there are no other pending RQ messages corresponding to the same RQ configuration;

Successful completion of a recovery procedure is determined;

The first cell or cell group including the first cell is activated or de-activated;

Another cell or another cell group is activated or de-activated, wherein the other cell or the other cell group is associated with a recovery configuration or are associated with the RQ transmission counter; or A parameter of the beam recovery configuration (e.g., RQ message configuration) is reconfigured.

An RS for beam failure detection and/or an RS for new candidate beam determination is reconfigured.

Additionally, the wireless communication device 102 the transmission resources for the RQ message may be further configured by establishing a periodicity parameter for transmission of the RQ message, establishing an offset parameter for transmission of the RQ message, and/or establishing a PUCCH resource index, which is selected from a PUCCH resource pool.

Additionally, in the cell, the beam failure recovery configuration can be associated with an RQ configuration, e.g., which may be a dedicated SR message configuration for recovery, where the RQ information is delivered by the dedicated SR resource. Furthermore, the dedicated SR message configuration can comprise at least one of the following parameters:

The prohibit timer. The parameter for a prohibit time is to describe the length of timing;

Threshold for maximum number of transmission,

Usage of the SR configuration. For example, a parameter of SR configuration can be "normal SR", "SR for logical channel", "URLLC" or "beam failure recovery."

Priority level. For example, a parameter of priority level can be high or low.

Periodicity and offset for SR transmission, which may be called, for example, as PeriodicityAndOffset.

PUCCH resource. Specifically, the PUCCH resource can be selected from a pool of PUCCH resources.

Additionally, in some embodiments, the RQ message configuration, e.g., a dedicated SR configuration, can be configured in RRC configuration parameter of MAC-Cell-GroupConfig or configured in RRC configuration parameter BeamFailureRecoveryConfig.

Additionally, in certain embodiments, the RQ message configuration can be configured in Pcell. For example, when multiple Scells can be configured with the beam recovery procedure (or multiple Scells can be associated with the beam recovery configuration), and the unique RQ message configuration is associated with the multiple Scells, the RQ message configuration can be configured in Pcell. However, it can be also configured in the Scells in other embodiments.

Prohibit Timer for the Beam Recovery Request Message

In a similar manner to the beam failure recovery timer discussed above, various timers and/or counters may be configured for the transmission of the beam recovery request message, as well. Recovery reporting via the beam recover request message is performed according to the prohibit timer for the beam recovery request message, which is used to prevent very-frequent transmission for the recovery reporting. The parameter for the prohibit timer for beam recovery request message, e.g., the parameter for timer expiration, may be configurable.

In one approach, the beam recover request message cannot be triggered and/or transmitted if the prohibit timer the beam recovery request message is running or is not expired. Conversely, the beam recover request message can be triggered and/or transmitted if the prohibit timer the beam recovery request message is stopped or is expired. With reference to FIG. 11, which illustrates additional details of the method of wireless radio link recovery in various embodiments, the wireless communication device 102 may determine whether the prohibit timer for the beam recovery request message is at least one of stopped or expired at 1102. At 1104, the wireless communication device 102 may responsively allow the transmission of the beam recovery request message and may restart the prohibit timer for the beam recovery request message when the prohibit timer for the beam recovery request message is at least one of stopped or expired.

Additionally, at 1106, the wireless communication device 102 may restart the prohibit timer for the beam recovery request message (e.g., at its configured initial value) when at least one of the following conditions is met:

The PUSCH resource can accommodate the beam recovery request message; and/or

A pending beam recovery request message is generated.

Similarly, at 1108, the wireless communication device 102 may stop the prohibit timer for the beam recovery request message when at least one of the following conditions is met:

A radio resource control (RRC) configuration parameter for the beam recovery request message is reconfigured (e.g., reconfiguration of an RRC parameter or configuration of the prohibit timer for the beam recovery request message);

A reference signal for beam failure detection or a reference signal for new candidate beam detection is reconfigured or re-determined (e.g., when a TCI state of the PDCCH or a control resource set (CORESET) is reconfigured);

Successful completion of a beam failure recovery procedure (e.g., when the beam failure recovery procedure corresponds to the first cell or cell group including the first cell);

The first cell or cell group including the first cell is activated or de-activated;

Another cell or another cell group is activated or de-activated, wherein the other cell or the other cell group is associated with a recovery configuration or is associated with the prohibit timer for the beam recovery request message; and/or A new beam failure even is determined for another cell.

Additionally, in some approaches, the prohibit timer for the beam recovery request message is specific to the first cell or cell group including the first cell. In other approaches, the prohibit timer for the beam recovery request message may be applied for a plurality of (or all of the) the cells that are configured with a beam recovery configuration. In such an approach, when a new cell beam failure event is claimed, the prohibit timer can be restarted.

UE Behavior for RQ Messages

Once a beam failure event has been determined, the wireless communication device 102 reviews various considerations prior to transmitting an RQ message. In various embodiments, if at least one of the following conditions is satisfied, a pending RQ message (which may also called as a pending SR message, e.g., for beam recovery) is generated and/or transmitted:

A number of beam failure instances for at least one cell is equal to or greater than a first threshold value (e.g., a beam failure event has been determined);

No PUSCH resource is available for or can accommodate transmitting the beam recovery request message;

The PUCCH resource for the RQ message does not overlap with a measurement gap or BWP-switching gap; and/or The PUCCH resource for the RQ message does not overlap with the PUSCH resource that could be used to transmit the beam recovery request message.

The wireless communication device 102 (e.g., the MAC-CE entity) has an RQ transmission occasion on the valid PUCCH resource for the RQ message (which may be a dedicated RS-RQ message). However, in one embodiment, if the wireless communication device 102 has an SR transmission occasion on the valid PUCCH resource for SR, then an SR message may be transmitted instead. However, the above behavior can be skipped when the first PUCCH resource for the RQ message is transmitted.

The RQ prohibit timer is not running at the time of RQ message transmission occasion;

The RQ transmission counter is less than or equal to the threshold for maximum RQ transmissions; and/or At least one SR is pending for the RS-RQ configuration.

As stated above, the RQ message may be a dedicated recovery-specific resource request (RS-RQ) message, or an SR message that is configured to indicating a type (e.g., for beam recovery purposes) or priority level (e.g., high/low) of the SR message. However, if there is not a dedicated RS-RQ configuration, an SR configuration that is associated with recovery configuration, or an SR configuration that accommodates indicating a type or priority level of the SR message, the wireless communication device 102 can at least generate a pending SR message corresponding to a SR configuration (e.g., a SR configuration for logical channel).

Additionally, as is shown in FIG. 12, a process for generating and canceling pending RQ messages is disclosed. At 1202, the beam failure recovery procedure is triggered when a cell fails. If the PUSCH resource for sending the beam recovery request message is available, then it is transmitted on the PUSCH resource at 1204. However, if the PUSCH resource is not available, then the RQ message is generated or triggered at 1206. The RQ message is put into a pool of pending RQ messages 1208. When the PUCCH resource is available, an RQ message from the pool of pending RQ messages 1208 (or directly from the generation step 1206) can be transmitted at 1210.

If a beam recovery request message is transmitted (at 1204) on the PUSCH resource while there is a corresponding pending RQ message in the pool 1208, then that pending RQ message can be cancelled. Additionally, if a pending RQ message in the pool 1208 can be cancelled in response to deactivating or activating the first cell or a cell group including the first cell that corresponds to the pending RQ message.

Similarly, if a MAC protocol data unit (PDU) message that includes the beam recovery request message(s) (e.g., the MAC-CE based recovery reporting) is transmitted, all of the pending RQ messages in the pool 1208 that were triggered prior to assembly of the MAC PDU message, which also correspond to the beam recovery request messages for the failed cells, can be cancelled. Similarly, each respective RQ prohibit timer or RQ transmission counter shall be stopped or reset when the MAC PDU is transmitted and this PDU includes a the beam recovery request message including indexes of failed cells up to the last beam failure event that triggered the beam recovery procedure prior to assembly of the MAC PDU message.

Transmission Priority for RQ Messages

In order to transmit the RQ message with sufficient priority, priority rules for RQ message transmission and other UL signaling, such as normal SR, hybrid automatic repeat request-acknowledgement (HARQ-ACK), CSI, or SRS, should be specified for UE behavior. As mentioned above, in accordance with various embodiments, the RQ message may be the dedicated RS-RQ message, a dedicated SR message type (e.g., configured with a parameter of usage for beam recovery or associated with a parameter of beam recovery configuration), or an SR message with a higher priority.

In one example, the RQ message comprises an SR message (e.g., a first SR message), wherein the SR message can be configured with a parameter of transmission priority (e.g., high/low), a parameter of usage (e.g., for beam recovery), or associated with a parameter of beam recovery configuration. Further, the RQ message can be assigned as a first SR message. Additionally, in certain examples, the first SR message may have a higher transmission priority as compared with a second SR message (e.g., a normal SR message) that is not used for beam recovery.

Different priority rule options are disclosed for the case that a normal SR message and an RQ message (e.g., the first SR message or a dedicated RS-RQ message) collide at a same time unit, or when different PUCCH resources for normal SR and the RQ message are overlapped.

As a first option, the RQ message shall be transmitted instead of a normal SR message when the RQ message and the normal SR message are transmitted or triggered in the same time domain unit or same transmission occasion. Put another way, the wireless communication device 102 transmits the information of the first SR message (as opposed to a second SR message that is a normal SR message), when the PUCCH resource assigned for the first SR message overlaps with a PUCCH resource assigned for a second SR message in a time unit. Similarly, when the RQ message comprises the dedicated RS-RQ message, in the above situation, the RS-RQ message has a higher transmission priority as compared with a normal SR message or a HARQ-ACK message and would be transmitted instead of the normal SR message or the HARQ-ACK message.

As a second option, a new PUCCH resource can be transmitted. The new PUCCH resource can be RRC configured for the case that the normal SR message and the RQ message collide at a same time unit, or when different PUCCH resources for the normal SR and the RQ message overlap. On the other hand, the new PUCCH resource can be derived by the wireless communication device 102 according to resources of PUCCH for normal SR messages and RQ messages. For instance, the initial cyclic shift value for the new PUCCH is the sum of initial cyclic shift value of respective PUCCH resources of normal SR and RQ messages mod X, where X is positive integer, e.g., 13.

As a third option, a priority rule for the RQ messages can be determined according to the configuration index for the SR message. More specifically, an SR message with a lower SR index will have a higher priority.

Additionally, in a specific embodiment, for PUCCH format 0, the RQ message (i.e., for beam recovery) can be indicated by a resource block (RB) index/location and/or a sequence index, e.g., a cycling shift offset in the message. For example, a sequence index of Mcs=6 can be used to represent the RQ message (e.g., an SR message for beam recovery, an SR message with a higher priority, or a dedicated RS-RQ message), while a sequence index of Mcs=0 can be used to represent a normal SR message with lower priority. Other sequence indexes are possible, as well. By varying the sequence index or RB index/location to indicate whether the message is an RQ message (i.e., relating to beam recovery) or not, the wireless communication node 104 can recognize that the request relates to beam recovery and assign UL resources for the beam recovery request message quickly.

Additional priority rules relating to collisions between the RQ message and an aperiodic sounding reference signal (SRS) are also disclosed. In various embodiments, the wireless communication device 102 transmits the RQ message with a higher transmission priority than the aperiodic SRS when the PUCCH assigned for the RQ message overlaps with the SRS in a time unit. The above priority rule also applies when the RQ message comprises an SR message, and when the SR message has an assigned usage for beam failure recovery, or the SR message is scrambled by a modulation coding scheme cell radio network temporary identifier (MCS-C-RNTI). Furthermore, the RQ message is transmitted when the PUCCH assigned for the RQ message overlaps with the SRS in a time unit.

Priority Rules for Multiplexing RQ Messages with Other Messages

Various priority rules are also provided for multiplexing the RQ message with other messages, e.g., a HARQ-ACK message, in PUCCH. As mentioned above, in accordance with various embodiments, the RQ message is for beam recovery, and may be the dedicated RS-RQ message, a dedicated SR message type (e.g., configured with a parameter of usage for beam recovery or associated with a parameter of beam recovery configuration), or an SR message with a higher priority. The following priority rules can apply to RQ messages of any type mentioned above, unless otherwise stated.

In a first example embodiment, when PUCCH format 0 is used for the HARQ-ACK message, and when the RQ message or normal SR message is multiplexed with a HARQ-ACK message, the following approaches are provided.

According to a first approach, a sequence cyclic shift value for the PUCCH format delivering multiplexing information is determined according to a positive RQ message or a positive normal SR message. For example, mapping of values for one HARQ-ACK information bit and a positive RQ message, for PUCCH format 0, is illustrated in Table 1, below.

TABLE 1

| HARQ-ACK value | 0 | 1 |
|---|---|---|
| Sequence cyclic shift | $m_{cs} = 3$ | $m_{cs} = 9$ |

However, in this same example, mapping of values for one HARQ-ACK information bit and a positive normal SR message, for PUCCH format 0, is illustrated in Table 2, below.

TABLE 2

| HARQ-ACK value | 0 | 1 |
|---|---|---|
| Sequence cyclic shift | $m_{cs} = 1$ | $m_{cs} = 7$ |

The sequence cyclic shift values can be varied. However, the four values that populate the two above tables may remain different in various embodiments.

According to a second approach, the PUCCH resource that delivers multiplexing information is determined according to the RQ message or the normal SR message, when either is multiplexed with the HARQ-ACK message. More specifically, when a positive RQ message is transmitted, the PUCCH resource corresponding to RQ message is used to deliver the information of multiplexing the RQ message and the HARQ-ACK message. However, when a positive normal SR is transmitted, the PUCCH resource corresponding to the HARQ-ACK message is used to deliver the information of multiplexing the normal SR message and the HARQ-ACK message.

In a second example embodiment, when PUCCH format 0 is used for the RQ message and PUCCH format 1 is used for the HARQ-ACK message, and when the RQ message or normal SR message is multiplexed with a HARQ-ACK message, the following approaches are provided. If the RQ message is positive, only the PUCCH format 0 resource with positive RQ is transmitted (e.g., using the PUCCH format 0 resource associated with the RQ message). However, if a normal SR message is positive, only the PUCCH format 1 resource with HARQ-ACK is transmitted. Additionally, it should be noted that if the PUCCH format 1 message is transmitted with 1-bit HARQ-ACK information, the other bit in the message can be used carrying the information of the RQ message.

In a third example embodiment, when PUCCH format 1 is used for both the RQ message and the HARQ-ACK message, and when the RQ message or normal SR message is multiplexed with a HARQ-ACK message, the following approaches are provided.

If either the RQ message or the normal SR message are positive, the PUCCH resource corresponding to the positive RQ message or the positive normal SR message is used for delivering the HARQ-ACK message. Conversely, if either of the RQ message or the normal SR message are negative, the PUCCH resource corresponding to the HARQ-ACK message is used for delivering the HARQ-ACK message.

In a fourth example embodiment, when PUCCH format 2, PUCCH format 3, or PUCCH format 4 are used for delivering the RQ message (e.g., a dedicated SR message or SR message with a higher priority), the SR message bit(s) first, then the HARQ-ACK message bit(s) and/or CSI bit(s) (if any) are combined for coding in PUCCH. Put another way, when there are collisions between the RQ message and the HARQ-ACK message, the wireless communication device 102 can transmit the RQ message followed by the HARQ-ACK message on the PUCCH resource assigned for the HARQ-ACK message when the HARQ-ACK message is assigned with at least one of PUCCH format 2, PUCCH format 3, or PUCCH format 4.

However, when PUCCH format 2 or PUCCH format 3 or PUCCH format 4 are used for delivering the normal SR message, HARQ-ACK bit(s) first, then the SR message bit(s) and/or CSI bit(s) (if any) are combined for coding in PUCCH. Put another way, when there are collisions between the second SR message (normal SR message) and the HARQ-ACK message, the wireless communication device 102 can transmit the HARQ-ACK message followed by the second SR message on the PUCCH resource assigned for the HARQ-ACK message when the HARQ-ACK message is assigned with at least one of PUCCH format 2, PUCCH format 3, or PUCCH format 4.

Furthermore, the above two approaches in the fourth example embodiments can occur regardless of whether the RQ message or the normal SR message is positive or negative.

In accordance with the above disclosed example priority rules for multiplexing, the following example methods are provided.

Figure 13:
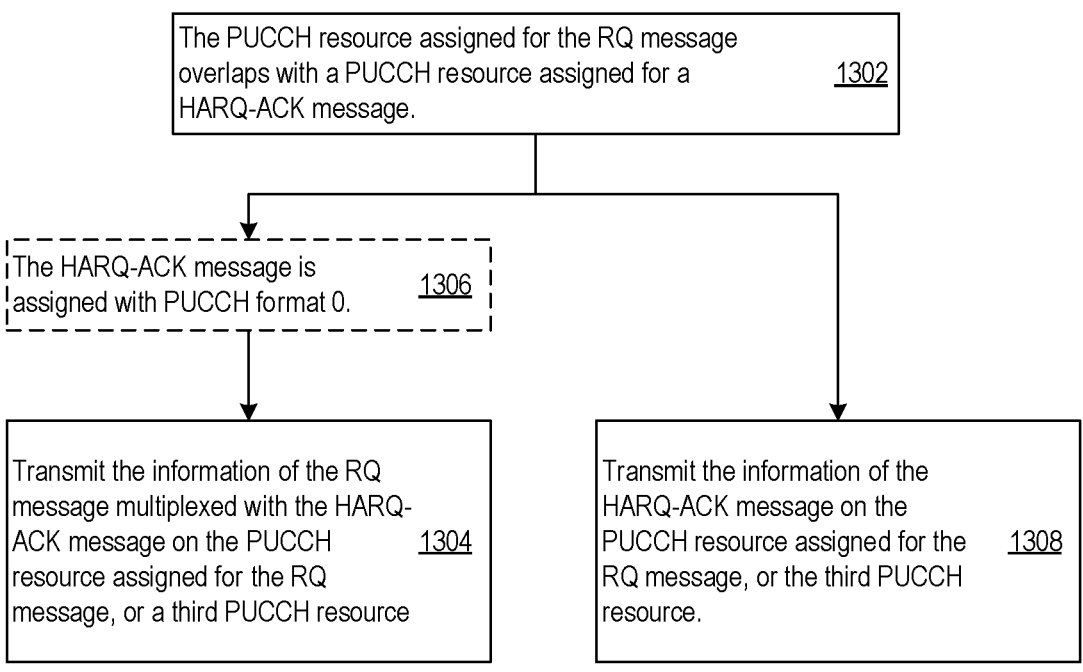
FIG. 13 shows another example of additional details of a method for wireless radio link recovery, according to various embodiments.

Referring to FIG. 13, which discloses additional details of the wireless radio link recovery method, when a PUCCH resource assigned for the RQ message overlaps with a PUCCH resource assigned for a HARQ-ACK message in a time unit, as shown at 1302, transmitting the RQ message further utilizes at least one of the following techniques. In a first approach, at 1304, the wireless communication device 102 transmits the information of the RQ message multiplexed with the HARQ-ACK message on the PUCCH resource assigned for the RQ message, or on a third PUCCH resource. Put another way, the PUCCH resource corresponding to RQ message is used to deliver the information from multiplexing the RQ message and the HARQ-ACK message when a positive RQ message is transmitted. In various examples, this first approach 1304 may be performed when the HARQ-ACK message is assigned with PUCCH format 0, as shown at 1306. In a second approach, at 1308, the wireless communication device 102 transmits the information of the HARQ-ACK message on the PUCCH resource assigned for the RQ message, or the third PUCCH resource.

In certain examples, the third PUCCH resource may be configured according to an RRC parameter for the case that the HARQ-ACK message and the RQ message collide at a same time unit, or when different PUCCH resources for the HARQ-ACK message and the RQ message overlap. On the other hand, the new PUCCH resource can be derived by configuration parameters of the PUCCH resources for the HARQ-ACK message and the RQ message. For instance, the initial cyclic shift value for the new PUCCH is the sum of initial cyclic shift value of respective PUCCH resources of the HARQ-ACK message and the RQ messages mod X, where X is positive integer, e.g., 13.

Figure 14:
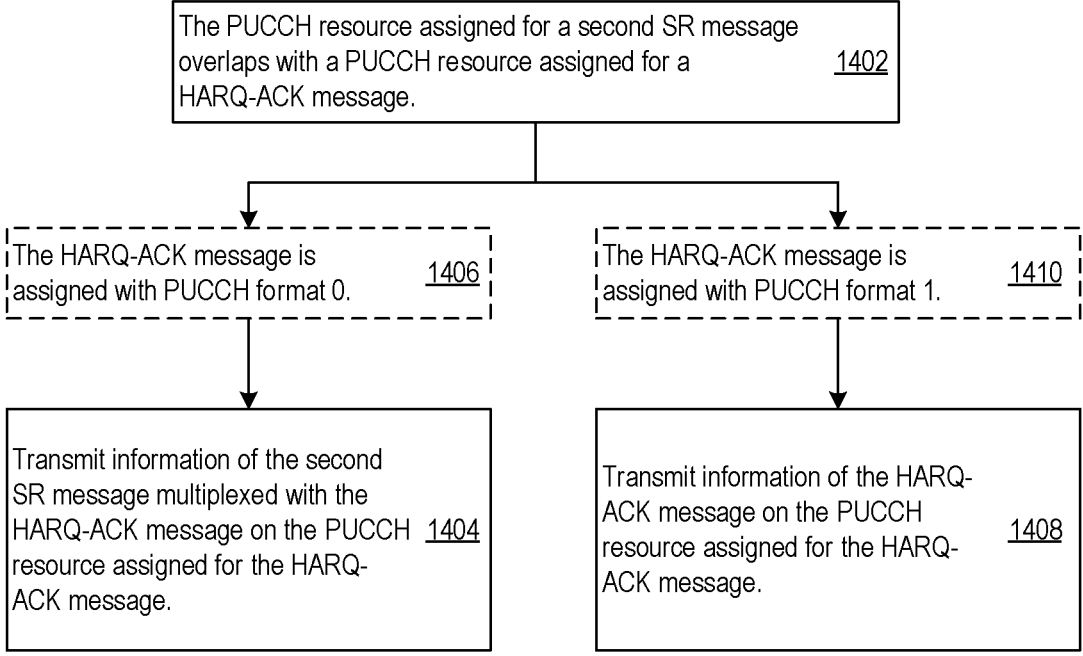
FIG. 14 shows another example of additional details of a method for wireless radio link recovery, according to various embodiments.

Referring to FIG. 14, which discloses additional details of the wireless radio link recovery method, when a PUCCH resource assigned for a second SR message (e.g., a normal SR message, particularly when the RQ message is a first SR message for beam recovery) overlaps with a PUCCH resource assigned for a HARQ-ACK message in a time unit, as shown at 1402, transmitting the second SR message further utilizes at least one of the following techniques. In a first approach, at 1304, the wireless communication device 102 transmits the information of the second SR message multiplexed with the HARQ-ACK message on the PUCCH resource assigned for the HARQ-ACK message. In various examples, this first approach 1404 may be performed when the HARQ-ACK message is assigned with PUCCH format 0, as shown at 1406. In a second approach, at 1408, the wireless communication device 102 transmits the information of the HARQ-ACK message on the PUCCH resource assigned for the HARQ-ACK message. In various examples, this second approach 1408 may be performed when the HARQ-ACK message is assigned with PUCCH format 1, as shown at 1410.

FIG. 15 discloses additional details of the wireless radio link recovery method in accordance with various embodiments. At 1502, the wireless communication device 102 determines that the PUCCH resource assigned for the RQ message (e.g., a first SR message) overlaps with a PUCCH resource assigned for the HARQ-ACK message in a time unit. At 1504, the wireless communication device 102 may then multiplex a HARQ-ACK value (e.g., 1 or 0) with the RQ message by selecting a sequence cyclic shift value of the HARQ-ACK message dependent upon the HARQ-ACK value and the RQ message (e.g., positive message), wherein the sequence cyclic shift value is different than is used for transmitting a second SR message (e.g., a normal SR message). Examples values for the sequence cyclic shift value are provided in Tables 1 and 2, above.

FIG. 16 discloses additional details of the wireless radio link recovery method in accordance with various embodiments. At 1602, the wireless communication device 102 determines that the PUCCH resource assigned for the RQ message overlaps with a PUCCH resource assigned for the HARQ-ACK message in a time unit. At 1604, the wireless communication device 102 may then transmit the RQ message on the PUCCH resource assigned for the RQ message. In various examples, step 1604 may be performed when at least one of the following conditions is satisfied:

At least one of the PUCCH resource assigned for the RQ message or the PUCCH resource assigned for the HARQ-ACK message is format 0 (1606);

The PUCCH resource assigned for the RQ message has a different format than the PUCCH resource assigned for the HARQ-ACK message (1608);

A format of the PUCCH resource assigned for the RQ message is format 1 and a format of the PUCCH resource assigned for the HARQ-ACK message is format 0 (1610); and/or A format for the PUCCH resource assigned for the RQ message is format 0 and a format for the PUCCH resource assigned for the HARQ-ACK message is format 1 (1612).

Beam Recovery Request Message Configurations

The beam recovery request message, as well as the conditions for transmitting it, may be subject to different rules. In various examples, when at least one of the following conditions are satisfied, the beam recovery request message can be triggered:

At least one beam failure event is claimed, i.e., the number of beam failure instances is more than or equal to the threshold;

The prohibit timer for the beam recovery request message is expired or is stopped; and/or The beam failure event changes, or a new cell beam failure event is claimed. (For example, q_old is not equal to q_new, where q_old is SCell_Index set when triggering last beam failure reporting, and q_new is real-time SCell_Index set.)

In various examples, the beam recovery request message can be transmitted when at least one beam recovery request message is triggered, and/or the allocated UL resources (e.g., the PUSCH resource) can accommodate transmitting the beam recovery request message. Alternatively, as has been discussed throughout, if no allocated UL resources (e.g., no PUSCH resource) is available that can accommodate transmitting the beam recovery request message, the RQ request procedure is triggered (e.g., "step 1").

In accordance with various embodiments, one or more of the following procedures may be performed in coordination with the transmission of the beam recovery request message:

The value of failed cell indexes are obtained;

The value of CSI-RS or SSB index of new candidate beams according to the failed cell, or the state of non-identifying a candidate beam for at least one failed cell is obtained;

A multiplexing and/or assembly procedure to generate and transmit the beam recovery request message is initiated;

The prohibit timer for the beam recovery request message is restarted; and/or

The triggering beam recovery request message is cancelled.

The format of the beam recovery request message may include different options in accordance with various embodiments. FIG. 17 shows example beam recovery request message formats in accordance with various embodiments. In a first embodiment, the beam recovery request message corresponds to a single failed cell, as is shown at 1702. In such an approach, the priority for transmission of more than one beam recovery request message can be based on an index of the respective failed cells corresponding to the more than one beam recovery request messages. For example, the beam recovery request message corresponding to a lower (or higher) index of the respective failed cells can be sent with a higher priority.

In a second embodiment, the beam recovery request message corresponds to information of multiple failed cells and a number of the multiple failed cells, as is shown at 1704 and 1706. Similarly, the beam recovery request message may correspond to a plurality of cells that are associated with a recovery configuration. In these examples, the length of the beam recovery request message is determined according to the number of failed cells or number of cells configured with recovery procedure. In the example beam recovery request message format shown in 1704, only information related to the failed cells is provided. One field for indicating the number of failed cells may also be provided. The number of failed cells may be provided first, which can be used for decoding the beam recovery request message or determining its length. Subsequently, for each of the failed cells, the index for failed cell and a corresponding new candidate beam index (e.g., RS index), or an indication of non-identified candidate beam state, can be provided.

In the example beam recovery request message format shown in 1706, a plurality of (or all of) the cells that are associated with a recovery configuration are included in the message 1706. In this example, information for all cells is provided, regardless that cell is failed or not. A fail flag field is provided for each of the cells to indicate whether each individual cell has failed or not. For each cell associated with the recovery configuration, the information for recovery is provided, including the one fail flag, and an index of a new candidate beam (e.g., RS index) or an indication of a state of non-identifying a candidate beam for at least one failed cell. In each of the above examples, the formats may be configurable. The above examples are non-limiting and may be altered further.

Successful Recovery from a Beam Failure

The beam failure recovery successful event, successful completion of the recovery procedure, or the state that the beam failure recovery is completed successfully, is determined when the wireless communication device 102 receives at least one of the following responses from the wireless communication node 104.

PDCCH or DCI with RNTI dedicated for recovery is received;

PDCCH or DCI in the CORESET or search space for recovery is received;

DCI codepoint associated with the link recovery is received;

A MAC command confirming the link recovery request message is received;

An indication for new data for a PUSCH carrying the beam recovery request message is received. Additionally, the indication for new data is associated with the same HARQ process number; and/or Reconfiguration or activation of a TCI associated with PDCCH or CORESET is received.

Furthermore, when the beam failure recovery successful event, successful completion of the recovery procedure, or the state that the beam failure recovery is completed successfully is determined, the QCL assumption for all PDCCH for cells or cell groups is determined according to the new identified RS. Furthermore, the above approach is up to UE capability, or the above approach is performed when the new candidate beam index (e.g., RS index) is reported in the beam recovery request message. Furthermore the cells or cell groups are associated with beam recovery configuration.

In various embodiments, as illustrated in FIG. 1, the wireless communication device 102 includes a processor

110 and a memory 112, wherein the processor 110 is configured to read computer code from the memory 112 to implement any of the methods and embodiments disclosed above relating to operations of the wireless communication device 102. Similarly, the wireless communication node 104 includes a processor 120 and a memory 122, wherein the processor 120 is configured to read computer code from the memory 122 to implement any of the methods and embodiments disclosed above relating to operations of the wireless communication node 104. Also, in various embodiments, a computer program product includes a non-transitory computer-readable program medium (e.g., memory 112 or 122) with computer code stored thereupon. The computer code, when executed by a processor (e.g., processor 110 or 120), causes the processor to implement a method corresponding to any of the embodiments disclosed above.

Note that in this document a "beam" may be equivalent to a reference signal (RS), a spatial filter, or pre-coding. Specifically, a "Tx beam" may be equivalent to a DL or UL reference signal (such as channel state information reference signal (CSI-RS), synchronization signal block (SSB) (which is also called as SS/PBCH), demodulation reference signal (DMRS), sounding reference signal (SRS)), a Tx spatial filter, or Tx precoding ("Tx" refers to "transmit" or "transmitter"). An "Rx beam" may be equivalent to a spatial filter, an Rx spatial filter, or Rx precoding ("Rx" refers to "receive" or "receiver."). A "beam ID" may be equivalent to reference signal index, a spatial filter index, or a precoding index. Specifically, the spatial filter can be either at the UE-side or gNB-side, and the spatial filter is called as spatial-domain filter.

Note that in this document, "spatial relation information" includes one or more reference RSs, which is used to represent a "spatial relation" between a targeted "RS or channel" and the one or more reference RSs, where a "spatial relation" means the same beam(s), same spatial parameter(s), or the same spatial domain filter(s).

Note that in this document, "QCL state" may include one or more reference RSs and their corresponding QCL type parameters, where QCL type parameters include at least one of the following or a combination: [1] Doppler spread, [2] Doppler shift, [3] delay spread, [4] average delay, [5] average gain, and [6] Spatial parameter. In this patent document, a "QCL state" may be equivalent to a transmission configuration indicator (TCI) state.

Note that in this document, if there is no special description, a "Pcell" may be equivalent to a primary cell or a primary cell in a corresponding cell group, e.g., PScell.

Note that in this document, a link recovery may be equivalent to beam recovery.

Note that in this document, a "time unit" may be a sub-symbol, a symbol, a slot, a subframe, a frame, or a transmission occasion.

Note that in this document, PUSCH may be equivalent to uplink shared channel (UL-SCH).

Note that in this document, "no PUSCH resource is available for transmitting a message" may be equivalent to "no PUSCH resource meets the requirement for transmitting a message".

Note that in this document, PUSCH resource may be equivalent to PUSCH occasion.

Note that in this document, PUCCH resource may be equivalent to PUCCH occasion.

Section headings are used in the present document only to improve readability and do not limit scope of the disclosed embodiments and techniques in each section to only that section.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "of", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A wireless radio link recovery method comprising:

determining, by a wireless communication device, a beam failure event for a first cell according to channel qualities corresponding to one or more reference signal resources transmitted by a wireless communication node;

determining, by the wireless communication device, whether a physical uplink shared channel (PUSCH) resource is available for transmitting a beam recovery request message;

transmitting, by the wireless communication device to the wireless communication node, the beam recovery request message on the PUSCH resource in response to determining that the PUSCH resource is available for transmitting the beam recovery request message, wherein the beam recovery request message comprises an index of the first cell; and transmitting, by the wireless communication device to the wireless communication node via a second cell, a resource request (RQ) message on an uplink control channel in response to determining that the PUSCH resource is not available for transmitting the beam recover request message, the RQ message requesting allocation of the PUSCH resource and comprising a first scheduling request (SR) message associated with a parameter of a beam recovery configuration, wherein the RQ message is transmitted with a higher transmission priority than an aperiodic sounding reference signal (SRS) when a physical uplink control channel (PUCCH) resource assigned for the RQ message overlaps with the SRS in a time unit.

2. The wireless radio link recovery method of claim 1, wherein the beam recovery request message comprises a medium access control element (MAC-CE) message, including an index of a candidate reference signal for the first cell or an indication that no candidate reference signal is identified for the first cell.

3. The wireless radio link recovery method of claim 1, wherein transmitting the beam recovery request message comprises transmitting the beam recovery request message on the PUSCH resource using a second cell.

4. The wireless radio link recovery method of claim 1, wherein determining the beam failure event for the first cell comprises:

determining that one or more values representing the channel qualities of the one or more reference signal resources are outside an acceptable range determined by a quality threshold;

incrementing a beam failure counter; and determining that the beam failure counter is greater than or equal to a beam failure counter threshold to determine a beam failure event.

5. The wireless radio link recovery method of claim 1, wherein transmitting the RQ message comprises transmitting the RQ message when the following conditions are met:

the PUCCH resource for the RQ message does not overlap with a measurement gap; and the PUCCH resource for the RQ message does not overlap with the PUSCH resource.

6. The wireless radio link recovery method of claim 1, further comprising:

canceling a pending RQ message to be transmitted in response to:

transmitting, by the wireless communication device, a protocol data unit (PDU) message that includes the beam recovery request message; or deactivating the first cell.

7. The wireless radio link recovery method of claim 1, wherein transmitting the RQ message further comprises:

transmitting the RQ message with a higher transmission priority than an aperiodic sounding reference signal (SRS) when a PUCCH assigned for the RQ message overlaps with the SRS in a time unit.

8. The wireless radio link recovery method of claim 1, further comprising:

determining that an RQ prohibit timer is stopped, expired, or both; and allowing the transmission of the RQ message and restarting the RQ prohibit timer when the RQ prohibit timer is either stopped or expired.

9. The wireless radio link recovery method of claim 1, further comprising:

determining that an RQ transmission counter has not reached a maximum number of RQ transmissions; and incrementing the RQ transmission counter and allowing the transmission of the RQ message.

10. The wireless radio link recovery method of claim 9, wherein the RQ transmission counter is reset when an RQ transmission is triggered and there are no other pending RQ messages corresponding to the same RQ configuration.

11. A wireless communication device comprising: a processor and a memory, wherein the processor is configured to read computer code from the memory to perform steps comprising:

determining, by the wireless communication device, a beam failure event for a first cell according to channel qualities corresponding to one or more reference signal resources transmitted by a wireless communication node;

determining, by the wireless communication device, whether a physical uplink shared channel (PUSCH) resource is available for transmitting a beam recovery request message;

transmitting, by the wireless communication device to the wireless communication node, the beam recovery request message on the PUSCH resource in response to determining that the PUSCH resource is available for transmitting the beam recovery request message, wherein the beam recovery request message comprises an index of the first cell; and transmitting, by the wireless communication device to the wireless communication node via a second cell, a resource request (RQ) message on an uplink control channel in response to determining that the PUSCH resource is not available for transmitting the beam recover request message, the RQ message requesting allocation of the PUSCH resource and comprising a first scheduling request (SR) message associated with a parameter of a beam recovery configuration, wherein the RQ message is transmitted with a higher transmission priority than an aperiodic sounding reference signal (SRS) when a physical uplink control channel (PUCCH) resource assigned for the RQ message overlaps with the SRS in a time unit.

12. The wireless communication device of claim 11, wherein the beam recovery request message corresponds to a plurality of cells that are associated with a recovery configuration.

13. The wireless communication device of claim 11, wherein the processor is configured to the read computer code from the memory to determine the beam failure event for the first cell by steps comprising:

determining that one or more values representing the channel qualities of the one or more reference signal resources are outside an acceptable range determined by a quality threshold;

incrementing a beam failure counter; and determining that the beam failure counter is greater than or equal to a beam failure counter threshold to determine a beam failure event.

14. The wireless communication device of claim 11, wherein the processor is configured to the read computer code from the memory to transmit the RQ message when the following conditions are met:

the PUCCH resource for the RQ message does not overlap with a measurement gap; and the PUCCH resource for the RQ message does not overlap with the PUSCH resource.

15. The wireless communication device of claim 11, wherein the processor is further configured to the read computer code from the memory to perform steps comprising:

canceling a pending RQ message to be transmitted in response to:

transmitting, by the wireless communication device, a protocol data unit (PDU) message that includes the beam recovery request message; or deactivating the first cell.

16. The wireless communication device of claim 11, wherein the processor is further configured to the read computer code from the memory to perform steps comprising:

determining that an RQ prohibit timer is stopped, expired, or both; and allowing the transmission of the RQ message and restarting the RQ prohibit timer when the RQ prohibit timer is either stopped or expired.

17. The wireless communication device of claim 11, wherein the processor is configured to read computer code from the memory to perform steps comprising:

determining that an RQ transmission counter has not reached a maximum number of RQ transmissions;

incrementing the RQ transmission counter and allowing the transmission of the RQ message; and resetting the RQ transmission counter when an RQ transmission is triggered and there are no other pending RQ messages corresponding to the same RQ configuration.

* * * * *